: US 7,840,845 B2
(45) Date of Patent: Nov. 23, 2010

(12) United States Patent
Doddapaneni et al.

(54) METHOD AND SYSTEM FOR SETTING A BREAKPOINT

(75) Inventors: Srinivas P. Doddapaneni, Hillsboro, OR (US); Ramesh V. Peri, Austin, TX (US); Gerold P. Mueller, Ulm (DE); Guido Kehrle, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1541 days.

(21) Appl. No.: 11/061,046

(22) Filed: Feb. 18, 2005

(65) Prior Publication Data

US 2006/0190769 A1    Aug. 24, 2006

(51) Int. Cl.
G06F 13/00 (2006.01)
G06F 9/44 (2006.01)
G06F 11/00 (2006.01)

(52) U.S. Cl. .................. 714/35; 717/129; 711/125
(58) Field of Classification Search ................ None
See application file for complete search history.

(56) References Cited

U.S. PATENT DOCUMENTS

| | | | |
|---|---|---|---|
| 4,811,208 A | 3/1989 | Myers et al. | |
| 5,479,652 A | 12/1995 | Dreyer et al. | |
| 5,488,728 A | 1/1996 | Dreyer | |
| 5,574,892 A | 11/1996 | Christensen | |
| 5,751,942 A | 5/1998 | Christensen et al. | |
| 5,787,467 A | 7/1998 | Abe | |
| 5,835,699 A | 11/1998 | Kimura | |
| 5,838,975 A | 11/1998 | Abramson et al. | |
| 5,850,554 A | 12/1998 | Carver | |
| 6,047,357 A | 4/2000 | Bannon et al. | |
| 6,182,208 B1 * | 1/2001 | Peri et al. | 712/227 |
| 6,240,545 B1 | 5/2001 | Carmichael et al. | |
| 6,249,907 B1 | 6/2001 | Carter et al. | |
| 6,571,359 B1 | 5/2003 | Padwekar et al. | |
| 6,671,780 B1 | 12/2003 | Lu et al. | |
| 6,671,795 B1 | 12/2003 | Marr et al. | |
| 6,687,790 B2 | 2/2004 | Zager et al. | |
| 6,785,850 B2 | 8/2004 | Dzoba et al. | |
| 6,862,694 B1 * | 3/2005 | Tormey et al. | 714/34 |
| 7,168,067 B2 * | 1/2007 | Betker et al. | 717/129 |
| 7,296,259 B2 * | 11/2007 | Betker et al. | 717/129 |
| 2002/0073401 A1 | 6/2002 | Sangavarapu et al. | |
| 2003/0126454 A1 | 7/2003 | Glew et al. | |
| 2003/0188173 A1 | 10/2003 | Zimmer et al. | |
| 2003/0217227 A1 * | 11/2003 | Parthasarathy et al. | 711/118 |
| 2004/0025095 A1 | 2/2004 | Nemani et al. | |

(Continued)

OTHER PUBLICATIONS

Intel, "Intel Xscale® Core Developer's Manual", Intel Corporation, Jan. 2004, pp. 1-219.*

(Continued)

Primary Examiner—Michael J Yigdall
Assistant Examiner—Ben C Wang (57) ABSTRACT

A method for setting a breakpoint includes the following: receiving an input specifying a location for insertion of a breakpoint in the executable program; determining a breakpoint address for insertion of the breakpoint in the executable program based on the specified location of the breakpoint; writing a breakpoint instruction into a second machine-accessible medium at the breakpoint address; and locking a line containing the breakpoint instruction into the second machine-accessible medium to prevent the breakpoint instruction from being overwritten.

2 Claims, 8 Drawing Sheets

U.S. PATENT DOCUMENTS

| | | |
|---|---|---|
| 2004/0040013 A1 | 2/2004 | Kalra |
| 2004/0059961 A1 | 3/2004 | Jentsch et al. |
| 2004/0083072 A1 | 4/2004 | Roth et al. |
| 2004/0083458 A1 | 4/2004 | Gschwind et al. |
| 2004/0088481 A1 | 5/2004 | Garney |
| 2004/0103272 A1 | 5/2004 | Zimmer et al. |

OTHER PUBLICATIONS

Texas Instruments, "TMS320VC5501/5502 DSP Instruction Cache Reference Guide", Texas Instruments Corporation, Jun. 2004, pp. 1-30.*

Intel XScale® Core Developer's Manual, "Instruction Cache," pp. 47-55 and "Software Debug," pp. 154-162, (Jan. 2004).

Tamura et al., "High Performance Memory Architectures with Dynamic Locking Cache for Real-Time Systems," 16th Euromicro Conference on Real-Time Systems, (Jun. 30-Jul. 2, 2004).

Rosner et al., "Filtering Techniques to Improve Trace-Cache Efficiency," Proceedings of the 2001 International Conference on Parallel Architectures and Compilation Techniques, pp. 37-48 (2001).

* cited by examiner

METHOD AND SYSTEM FOR SETTING A BREAKPOINT

FIELD OF THE DISCLOSURE

The present disclosure relates generally to a computer system for testing and debugging a program. More specifically, the present disclosure relates to a computer system and method for setting a breakpoint using an instruction cache.

BACKGROUND

Performance and reliability of processors are important factors in designing computer systems. Because processors are continually becoming more complex, they require more testing and debugging to ensure reliable performance. A program typically undergoes a debugging process to find and correct "bugs" in the operation of the program. As an example, to debug a processor, the processor is placed in a debug or test mode to prevent the processor's execution unit(s) from prefetching and decoding instructions. In this manner, when the processor is in the debug mode, external circuitry such as, for example, a debugger controls the execution unit(s) of the processor and examines the various states of the registers of the processor. By observing and controlling the state of the processor in the debug or test mode, the design and evaluation of the system incorporating the processor may be facilitated.

One technique for implementing breakpoints in a debugger is to overwrite an original instruction at the required address with a special instruction (known as a breakpoint instruction or an exception instruction), which provides control to the debugger when executed. After debugging is complete, the debugger then replaces the breakpoint instruction with the original instruction and continues execution. This technique for implementing software breakpoints may not be used with embedded processors, however, because much of the code in embedded processors might be located in read-only memories (ROMs) or semi read-only (flash) memories.

One solution to the problem of implementing breakpoints in embedded processors having ROM or flash memory is to implement hardware breakpoints using registers into which the address of a breakpoint instruction may be stored. The processor provides control to the debugger when it executes an instruction from an address that matches the address in one of the registers. Due to power and area issues, however, the number of registers and, therefore, the number of hardware breakpoints may be limited. For example, two hardware breakpoints are supported in the Intel Xscale® processor, and four hardware breakpoints are supported in the Micro-Signal Architecture (MSA) processor. The limited number of hardware breakpoints may be inadequate for debugging large applications.

DETAILED DESCRIPTION

Figure 1:
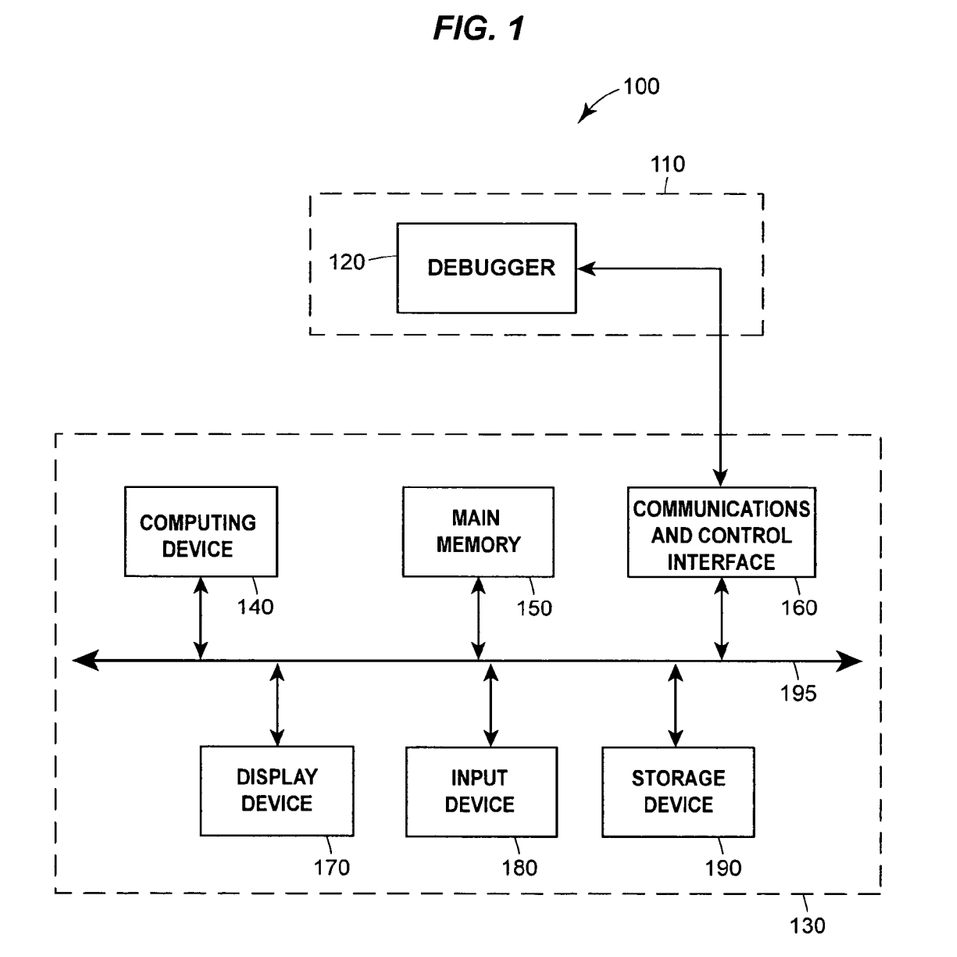
FIG. 1 is a schematic block diagram of an embodiment of a computer system.

Referring to FIG. 1, an embodiment of a computer system 100 for testing and debugging an executable program or application is shown. The computer system 100 may be a desktop computer, a laptop computer, a server, and the like. As shown in FIG. 1, the computer system 100 may include a development system 110 running a debugger 120 and a target system 130 that may include the executable program or process to be debugged.

The target system 130 may include a computing device 140, a main memory 150 to store the executable program to be debugged, and a communications and control interface 160 to enable communications between the development system 110 and the target system 130. The computing device 140 may be an embedded processor such as that sold by Intel® (e.g., any of the Pentium® family, the Itanium™ family and/or the Intel XScale® family of processors). However, it should be understood that any other type or brand of processor may be used such as, for example, an MSA processor, a digital signal processor (DSP), a pipelined processor, or any other type of processor that is capable of entering a debug or test mode and is capable of resuming normal operations after the debug or test mode. Although one computing device 140 is shown associated with the computer system 100 of FIG. 1, it should be understood that additional computing devices 140 may be associated with the computer system 100 as desired.

Typically, after going through a bootstrap initialization process, the computing device 140 may read, decode, and execute a plurality of instructions, which make up the executable program or process. Usually, the executable program is stored in the main memory 150, which might be external to the computing device 140. The main memory 150 may include any medium or device capable of storing instructions or data to be accessed by the computing device 140 such as, for example, a random access memory (RAM), a read-only memory (ROM), a flash memory, a linear memory, or a virtual memory.

The target system 130 may further include a display device 170, an input device 180, and a storage device 190. The display device 170 may include, for example, a video monitor. The input device 180 may include, for example, a keyboard, a mouse, a touch-sensitive screen, and the like. The storage device 190 may include any device capable of storing information such as, for example, a hard drive space, a floppy disk, a hard disk, an optical disk, a dynamic memory, or the like, located within the target system 130. Alternatively, the storage device 190 may be a memory located external to the target system 130. It should be understood that the computer system 100 may include other components such as, for example, other input/output equipment, a printer, or the like. The display device 170, the input device 180, and the storage device 190 are well-known components of a computer system 100 and, therefore, are not further discussed herein.

The various components of the target system 130 may be coupled to a system bus 195 that communicates information between the computing device 140 and other devices or components of the target system 130 such as, for example, the main memory 150, the display device 170, the input device 180, and the storage device 190. The system bus 195 may be a hardwired communication link or a wireless communication link.

The communications and control interface 160 may enable communications between the development system 110 and the target system 130, and may include, for example, a debug interface in accordance with the IEEE Standard 1149.1, entitled "Joint Test Access Port and Boundary Scan Architecture" or JTAG.

Prototype hardware and system software for the computer system 100 may often be tested and debugged using a host or development system 110, which may include a debugger 120 that monitors and controls the prototype computer system under test, i.e., the target system 130. The debugger 120 such as, for example, the Intel XDB™ debugger, may include a personal computer or a dedicated processor developed specifically to perform debugging operations. It should be understood that, although the debugger 120 is shown located in a development system 110 that is located remote from the target system 130 in FIG. 1, the debugger 120 may be local to the target system 130.

Figure 2:
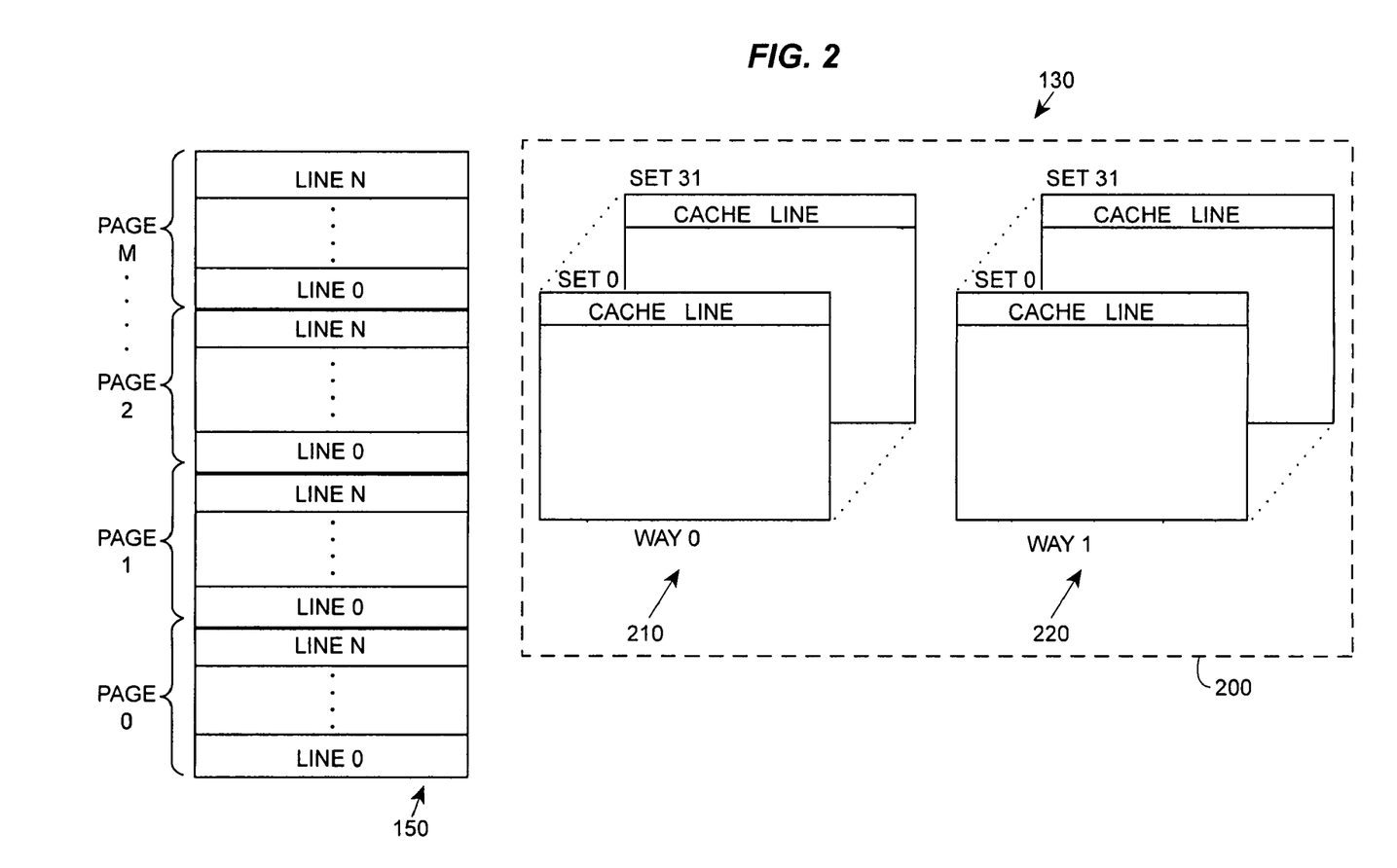
FIG. 2 is a schematic block diagram of an embodiment of a main memory and a two-way set associative cache memory associated with the computer system of FIG. 1.

Referring to FIG. 2, the target system 130 may further include a cache memory 200. In general, a cache memory 200 is a small, high-speed, volatile memory such as, for example, a random access memory (RAM) that temporarily stores blocks or portions of the slower main memory 150. For example, the cache memory 200 may store the most frequently accessed portions of main memory 150 or the most recently accessed portions of main memory 150 to enhance overall system performance. In this manner, the cache memory 200 may help to reduce the time it takes to move data to and from the computing device 140. It should be understood that the accessed portions of main memory 150 may include addresses, data, or instructions.

As shown in FIG. 2, the main memory 150 may be divided into one or more portions or pages. Each page in the example embodiment illustrated in FIG. 2 corresponds to a 4 kilobyte contiguous memory region; however, the main memory 150 may be implemented with different page sizes dependent upon the size of the main memory 150 or in a non-paging manner. Similarly, the cache memory 200 may be divided into one or more portions or pages. As with the pages of the main memory 150, the size of each cache page may be dependent upon the size of the cache memory 200 and the organization of the cache memory 200. A cache page may be broken into smaller portions or cache lines. The size of each cache line may be dependent upon the computing device 140 and the organization of the cache memory 200. The cache memory 200 may be located on a single chip or portions of the cache memory 200 may be located on multiple chips.

The cache memory 200 may be organized as a set associative cache. In a set associative cache, the blocks in the cache are partitioned into sets. Each set may store an identical number of blocks of the cache. Each block of main memory 150 may be cached in only one set within the cache memory 200. As a consequence, only one set of blocks may have to be checked for a particular requested memory block. Furthermore, when a read request for a block of main memory 150 is received, the cache memory 200 may check several blocks in parallel, thereby reducing the time required to determine if a block of main memory 150 is already in the cache memory 200.

In the embodiment illustrated in FIG. 2, the cache memory 200 is organized as a two-way set associative cache (i.e., a set associative cache with two degrees of associativity) having two blocks or segments 210, 220 known as cache ways. It should be understood, however, that the cache memory 200 may have any degree of associativity and may also be fully associative if desired. As set associative cache organizations are conventional, they will not be discussed further herein.

Once the debugger 120 initiates or generates a memory address or location for a breakpoint, the debugger 120 may apply a set mapping function to the memory address to selectively map the main memory address to a cache line in the cache memory 200. As a result, the debugger 120 may be able to determine which set of the cache memory 200 is to be compared with the requested memory address to determine whether the requested address resides in the cache memory 200.

Figure 3:
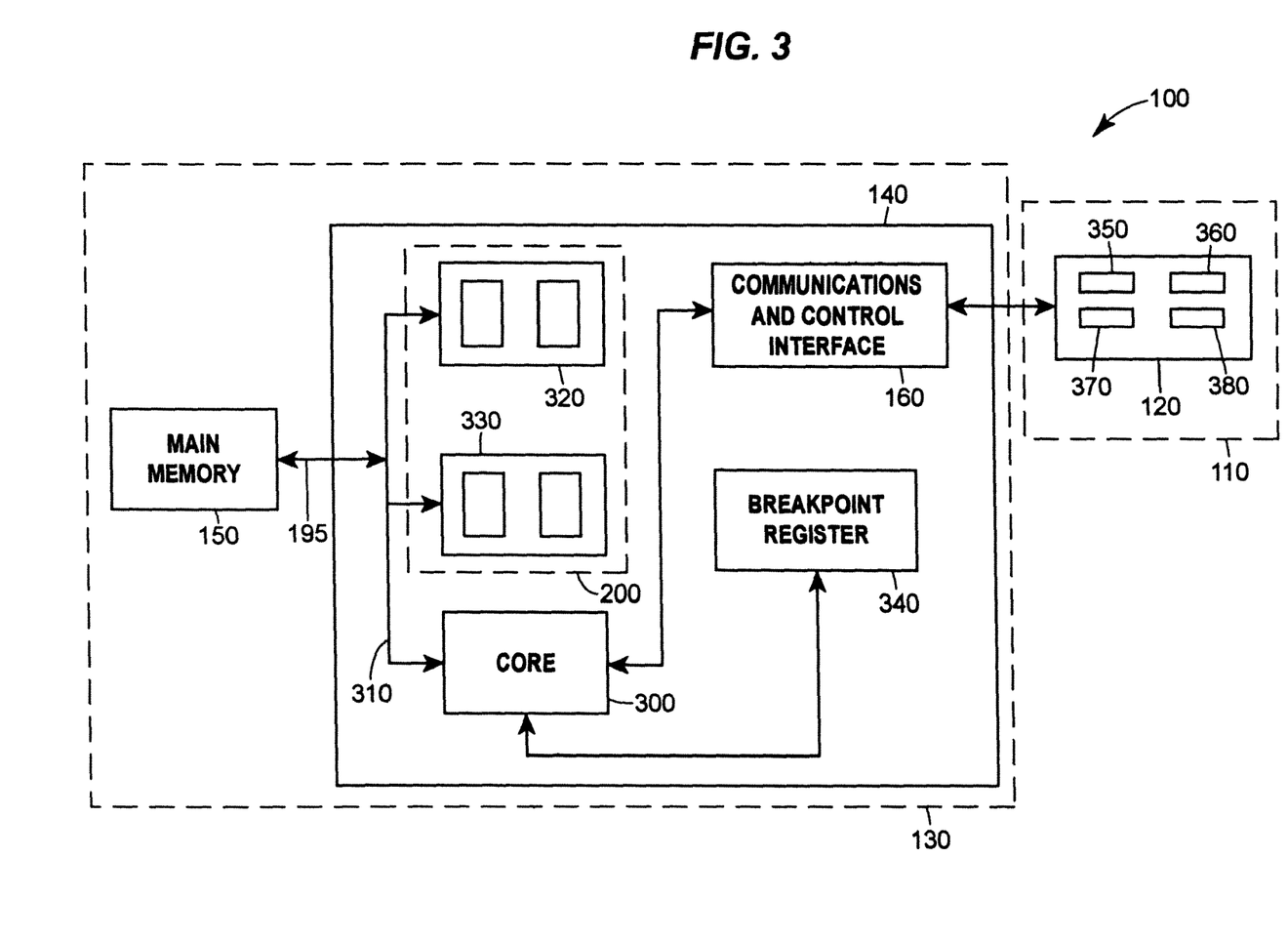
FIG. 3 is a detailed block diagram of an embodiment of a development system and a target system associated with the computer system of FIG. 1.

Referring to FIG. 3, a more detailed schematic diagram of an embodiment of the development system 110 and the target system 130 is shown. As shown in FIG. 3, the heart of the computing device 140 is a core 300. The core 300 may include, for example, an instruction decoder, a control unit, and an arithmetic unit. The executable program or code may be executed in the core 300 of the computing device 140.

The computing device 140 may also include the cache memory 200, which is coupled to the core 300 via a processing bus 310. As discussed above, the cache memory 200 may expedite the operation of the computer system 100 by reducing the number of fetches from main memory 150. Fetches from main memory 150 may result in large latencies because main memory 150 is typically located off chip. During operation, the core 300 may access data from the cache memory 200 via the processing bus 310 and may access off-chip components such as, for example, the main memory 150 via the system bus 195. In the case of a JTAG debug interface, the communications and control interface 160 may communicate directly with the processor core 300.

When the cache memory 200 contains a memory address requested by the core 300, a cache "hit" may occur and data from the cache line corresponding to the required address may be returned to the core 300 via the processing bus 310 without requiring access to the main memory 150. On the other hand, when the cache memory 200 does not contain a memory address requested by the core 300, a cache "miss" may occur, and the core 300 may subsequently request the data from the memory address in the main memory 150.

As shown in FIG. 3, the cache memory 200 may be an on-chip cache that is physically located internal to or integrated with the computing device 140. Alternatively, the cache memory 200 may be an external, off-chip cache that is physically located separate from the computing device 140. Although one cache memory 200 is shown associated with the computing device 140 in FIG. 3, it should be understood that one or more cache memories may be used as desired.

To improve performance, the cache memory 200 may be divided into an instruction cache 320 to store instructions to be executed by the computing device 140 and a data cache 330 to store data to be accessed by the computing device 140. The computing device 140 may execute instructions stored in the instruction cache 320, and may read and store data in the data cache 330.

A breakpoint register 340 may also be coupled to the core 300. As will be discussed in greater detail below, the breakpoint register 340 may store a breakpoint address associated with a hardware breakpoint.

The debugger 120 may include an input unit 350, an address unit 360 coupled to the input unit 350, a write unit 370 coupled to the address unit 360, and a lock unit 380 coupled to the write unit 370. The input unit 350 may receive an input specifying a location for insertion of a breakpoint in the main memory 150. The address unit 360 may determine a breakpoint address corresponding to the specified location in the main memory 150. The write unit 370 may write a breakpoint instruction into the cache memory 200 at the breakpoint address. The lock unit 380 may lock the cache line containing the breakpoint instruction into the cache memory 200 to prevent the locked cache line from being evicted from the cache memory 200 and, therefore, preventing the breakpoint instruction from being overwritten.

To perform testing and debugging, the computing device 140 may enter a debug mode. To enter the debug mode, a debug break, interrupt, or signal may be generated. As a result, the execution of the computing device 140 may be stopped or halted in response to the debug break or signal. The break may be generated by the computing device 140 encountering a breakpoint instruction or by the setting of a bit in hardware by, for example, connecting or asserting a break signal on one or more pins of the computing device 140.

Upon receiving the debug mode break or signal, the current program being executed by the computing device 140 may be stopped or halted. Additionally, state information necessary to resume normal execution of the computing device 140 after testing is complete such as, for example, instruction pointers, and the contents and status of all registers, memories, caches, and busses in the target system 130, may be saved to the storage device 190 (FIG. 1) or to a separate storage location. The separate storage location may be located external to the target system 130 such as, for example, in the development system 110.

After the original contents and instruction pointers are saved, the computing device may 140 execute a debug handler routine or process. The debug handler process may be stored and loaded from main memory 150, a separate computer system, or some other type of peripheral device. Some target systems 130 may not include a debug handler and, therefore, the functionality of the debug handler may be carried out by the core 300.

Generally, the debug mode break may operate similar to a normal interrupt or exception that occurs in the computing device 140. However, unlike normal interrupts or exceptions (which cause the instruction pointer of the computing device 140 to point to locations and handler processes in the main memory 150), the debug mode break may cause the computing device 140 to enter debug mode, to save the original instructions that are located in the instruction cache 320 of the cache memory 200 at the time the debug mode break occurs, and to load and execute the debug handler process. It should be understood that the debug handler process may be loaded and executed from the main memory 150 or the debug handler process may reside in cache memory 200 associated with the computing device 140. The debug handler process may include instructions that are executed by the computing device 140 to perform tests on the computing device 140 to determine if, for example, the computing device 140 is operating properly or has committed an error. The instructions that make up the debug handler process or debug kernel may include high-level programming such as, for example, loops, branches, nested loops, and the like.

The debug handler process may also transfer control to the debugger 120 in the development system 110. During operation, the debugger 120 may, for example, examine and modify the registers and memory locations of the target system 130, send a command or instruction to the computing device 140 of the target system 130 for execution, and receive data from the computing device 140 of the target system 130 via the communications and control interface 160.

After the computing device 140 executes the debug handler process, the computing device 140 may exit the debug mode by, for example, reloading the original instructions into the instruction cache 320 of the cache memory 200 or updating registers with state information required for resuming normal processing. Thereafter, the computing device 140 may resume normal processing.

Figure 4:
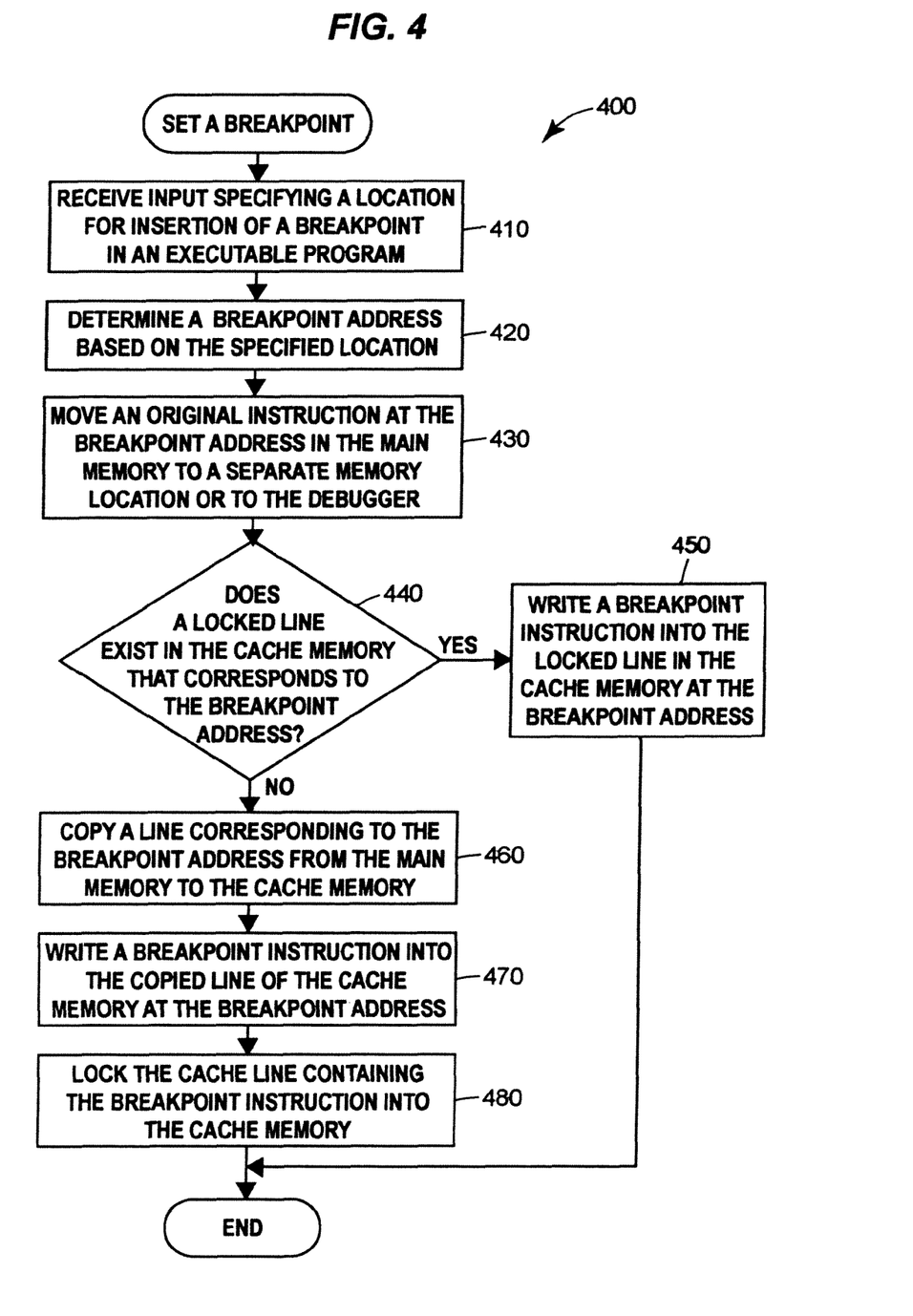
FIG. 4 is a flowchart of a process for setting a breakpoint according to one embodiment.

FIG. 4 is a flowchart of a process 400 for setting a breakpoint according to one embodiment. Referring to FIG. 4, if the user wishes to debug an executable program, the input unit 350 of the debugger 120 may receive an input from the user specifying a location of a breakpoint in the executable program at block 410. The user input may include at least one of an instruction, a label, a line number, a control event, and a function name for which the user requests the breakpoint.

Upon receiving the user-specified location for the breakpoint, the address unit 360 of the debugger 120 may determine a breakpoint address in the executable program based on the user-specified location for the breakpoint at block 420. After the address unit 360 initiates or generates a main memory address corresponding to the user-specified location for the breakpoint, the address unit 360 may apply a set mapping function to the main memory address to selectively map the main memory address to a cache line in the cache memory 200. The write unit 370 of the debugger 120 may then move an original instruction located at the breakpoint address in the instruction cache 320 of the cache memory 200 to a separate memory location or to the debugger 120 at block 430.

At decision block 440, the write unit 370 of the debugger 120 may determine whether a locked line exists in the cache memory 200 that corresponds to the breakpoint address. For example, if the process 400 for setting a breakpoint has been previously performed, then, as will be described in greater detail below, a line of the cache memory 200 containing a breakpoint instruction would have already been locked by the debugger 120. As such, if a locked line already exists in the cache memory 200 that corresponds to the breakpoint address, the write unit 370 may write a breakpoint instruction into the locked line in the cache memory 200 at the breakpoint address at block 450.

For example, because a single cache line may be mapped to several addresses, a cache line corresponding to an address for which a user currently requests a breakpoint may have already been locked due to the process 400 for setting a breakpoint having been previously performed for a different address in the same cache line. As a result, the number of cache lines that are locked by the debugger 120 may be kept to a minimum. After the write unit 370 of the debugger 120 has written a breakpoint instruction into the locked line in the cache memory 200 at the breakpoint address, the process 400 for setting a breakpoint may end. Thereafter, when the computing device 140 executes the breakpoint instruction, the computing device 140 may transfer control from the executable program to the debugger 120.

If a locked line does not exist in the cache memory 200 that corresponds to the current breakpoint address, the write unit 370 of the debugger 120 may copy a line corresponding to the current breakpoint address from the main memory 150 and write the copied line to the cache memory at block 460. At block 470, the write unit 370 of the debugger 120 may write a breakpoint instruction into the cache line that was copied from the main memory 150 into the instruction cache 320 at the breakpoint address. As a consequence of the breakpoint instruction being written into the instruction cache 320, the instructions stored in the instruction cache 320 may be different than the instructions stored in the main memory 150.

Next, the lock unit 380 of the debugger 120 may lock the cache line containing the breakpoint instruction at block 480 to prevent the cache line from being evicted and, therefore, preventing the breakpoint instruction from being overwritten. After the lock unit 380 of the debugger 120 has locked the cache line containing the breakpoint instruction, the process 400 for setting a breakpoint may end. Thereafter, when the computing device 140 executes the breakpoint instruction, the computing device 140 may transfer control from the executable program to the debugger 120.

Figure 5:
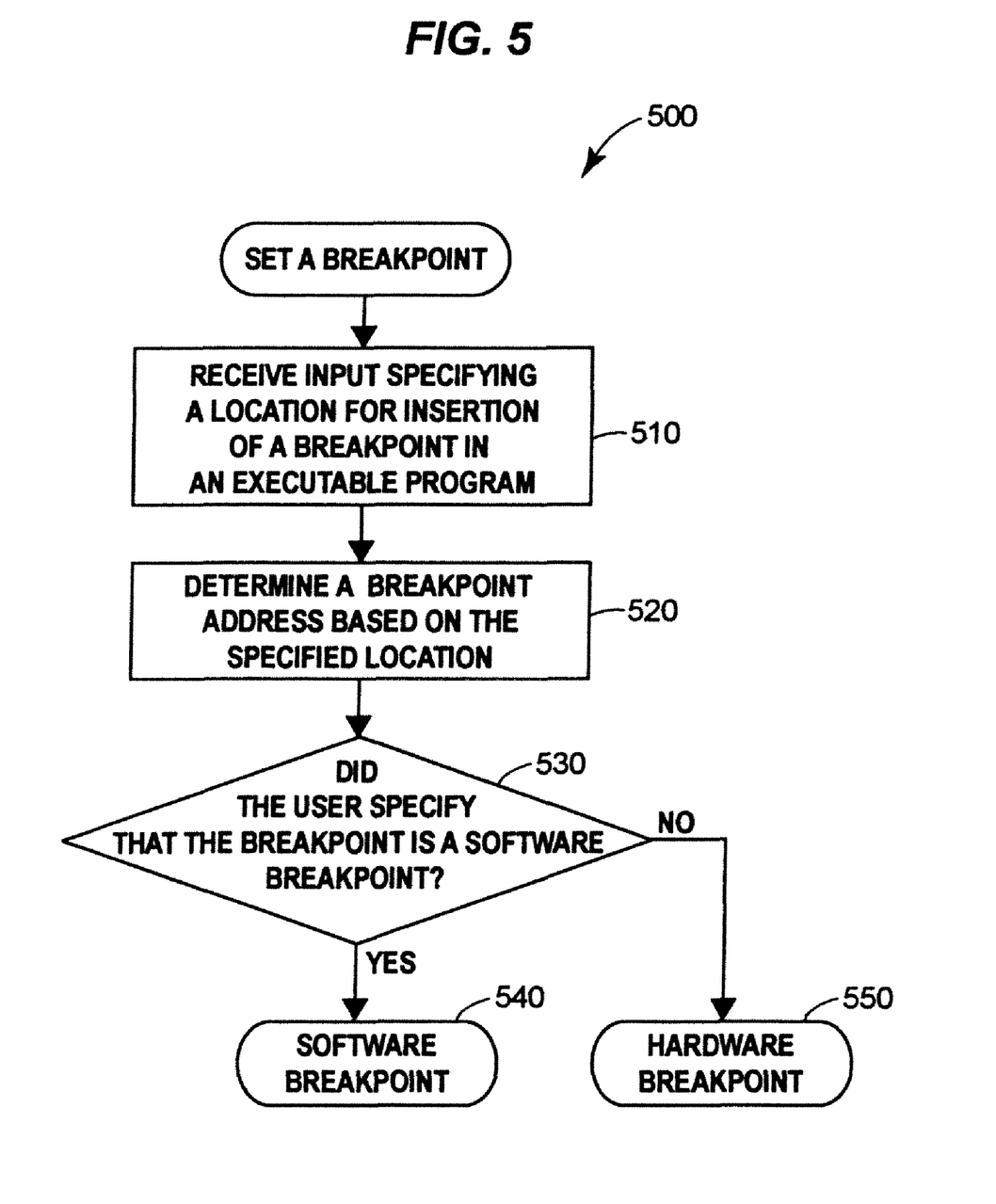
FIG. 5 is a flowchart of a process for setting a breakpoint according to another embodiment.

FIG. 5 is a flowchart of a process 500 for setting a breakpoint in accordance with another embodiment. Referring to FIG. 5, if the user wishes to debug the executable program, the input unit 350 of the debugger 120 may receive input from the user specifying a location of a breakpoint in the executable program at block 510. The user input may include at least one of an instruction, a label, a line number, and a function name for which the user requests the breakpoint.

Upon receipt of the user-specified location for the breakpoint, the address unit 360 of the debugger 120 may determine a breakpoint address based on the user-specified location for the breakpoint at block 520. After the address unit 360 of the debugger 120 initiates or generates a main memory address corresponding to the user-specified location for the breakpoint, the address unit 360 may apply a set mapping function to the main memory address to selectively map the main memory address to a cache line in the cache memory 200. At decision block 530, the debugger 120 may determine whether the user specified that the breakpoint is a software breakpoint. If the breakpoint is a software breakpoint, control may pass to the process 540 associated with setting a software breakpoint. On the other hand, if the breakpoint is a hardware breakpoint, control may pass to a process 550 associated with setting a hardware breakpoint.

Figure 6:
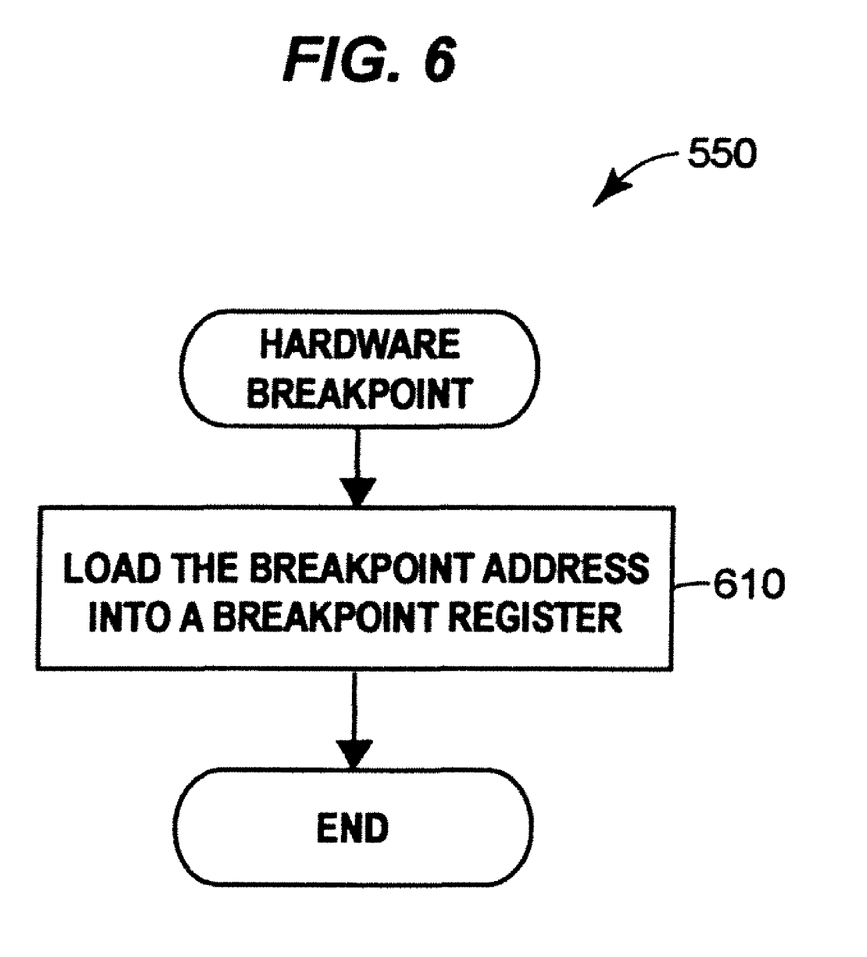
FIG. 6 is a flowchart of a process for setting a hardware breakpoint according to yet another embodiment.

FIG. 6 is a flowchart of a process 550 for setting a hardware breakpoint according to yet another embodiment. To set a hardware breakpoint, the computing device 140 may load the breakpoint address into the breakpoint register 340 at block 610. During execution of the executable program, the computing device 140 may compare an address of an instruction currently being executed with the breakpoint address in the breakpoint register 340 to determine whether the address of the current instruction matches the breakpoint address in the breakpoint register 340. If the address of the instruction currently being executed matches the breakpoint address in the breakpoint register 340, the computing device 140 may transfer control from the executable program to the debugger 120.

Figure 7:
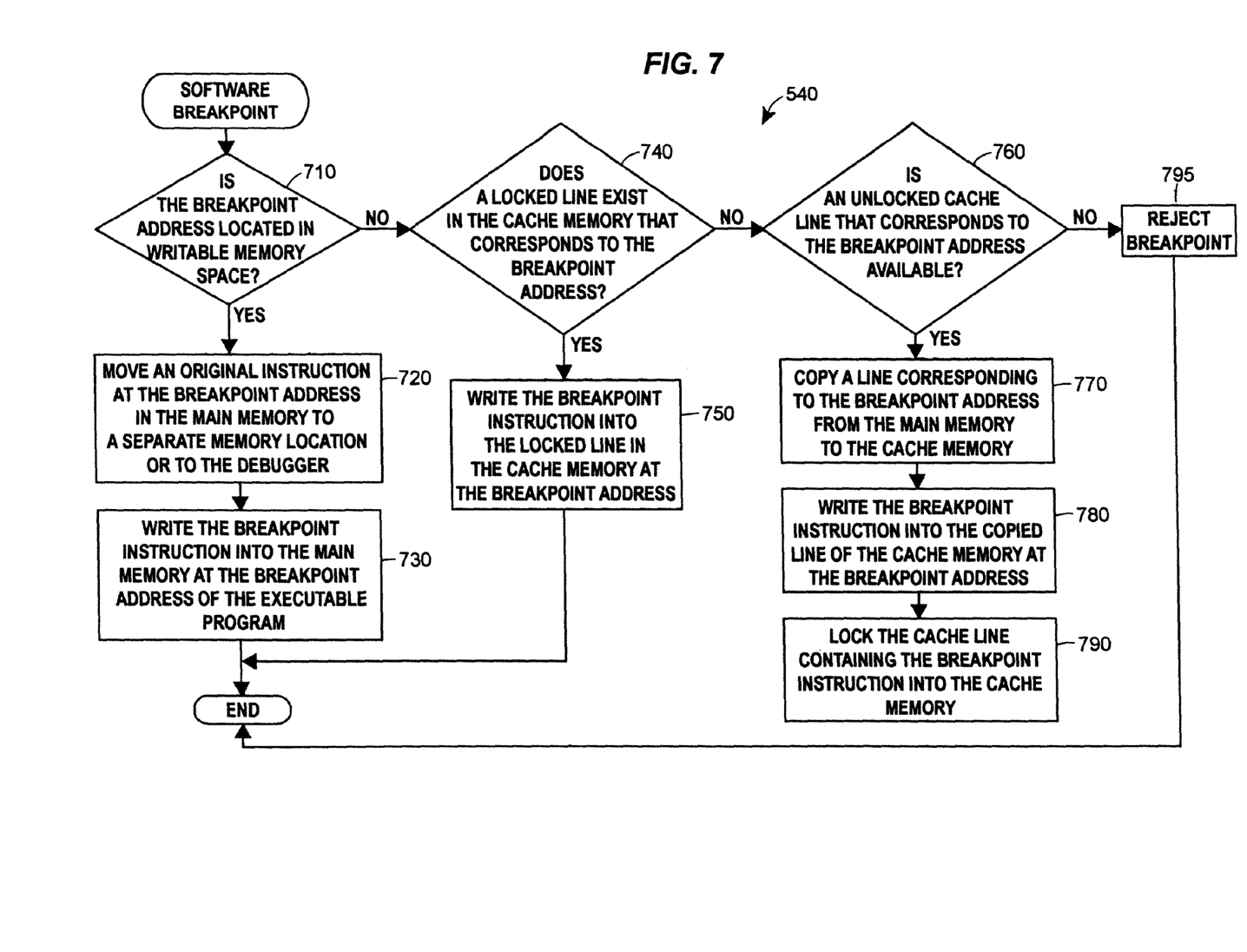
FIG. 7 is a flowchart of a process for setting a software breakpoint according to yet another embodiment.

FIG. 7 is a flowchart of a process 540 for setting a software breakpoint according to yet another embodiment. Referring to FIG. 7, the address unit 360 of the debugger 120 may determine whether the breakpoint address is located in writable memory space at decision block 710. If the breakpoint address is located in writable memory space of the main memory 150, control may pass to block 720 in which the original instruction at the breakpoint address in the main memory 150 may be copied to a separate memory location or to the debugger 120. At block 730, the write unit 370 of the debugger 120 may write the breakpoint instruction into the main memory 150 at the breakpoint address of the executable program. When the computing device 140 executes the breakpoint instruction at block 730, the computing device 140 may transfer control from the executable program to the debugger 120.

If the breakpoint address is not located in writable memory space of the main memory 150, control may pass to decision block 740 in which the address unit 360 of the debugger 120 determines whether a locked line already exists in the cache memory 200 that corresponds to the current breakpoint address. As stated above, if the process 400 for setting a breakpoint has been previously performed, then a line of the cache memory 200 that contains a breakpoint instruction would have already been locked by the debugger 120 and, therefore, a locked line would exist in the cache memory 200 that corresponds to the current breakpoint address. If a locked line already exists in the cache memory 200 that corresponds to the breakpoint address, control may pass to block 750 in which the write unit 370 of the debugger 120 may write a breakpoint instruction into the locked line of the cache memory 200.

On the other hand, if a locked line does not exist in the cache memory 200 that corresponds to the current breakpoint address, the write unit 370 of the debugger 120 may determine whether an unlocked cache line that corresponds to the current breakpoint address is available at block 760. If an unlocked cache line that corresponds to the current breakpoint address is available, the write unit 370 may copy a line corresponding to the current breakpoint address from the main memory 150 and write the copied line to the cache memory 200 at block 770.

At block 780, the write unit 370 of the debugger 120 may write a breakpoint instruction into the cache line that was copied from the main memory 150 into the instruction cache 320 at the breakpoint address. As a consequence of the breakpoint instruction being written into the instruction cache 320, the instructions stored in the instruction cache 320 may be different than the instructions stored in the main memory 150. Next, control may proceed to block 790 in which the lock unit 380 of the debugger 120 may lock the cache line containing the breakpoint instruction to prevent the cache line from being evicted and, therefore, preventing the breakpoint instruction from being overwritten.

If an unlocked cache line that corresponds to the breakpoint address is not available, the debugger 120 may reject the breakpoint at block 795. In rejecting the breakpoint, the debugger 120 may, for example, display a message on the display device 170 to notify the user that the requested breakpoint has been rejected.

Figure 8:
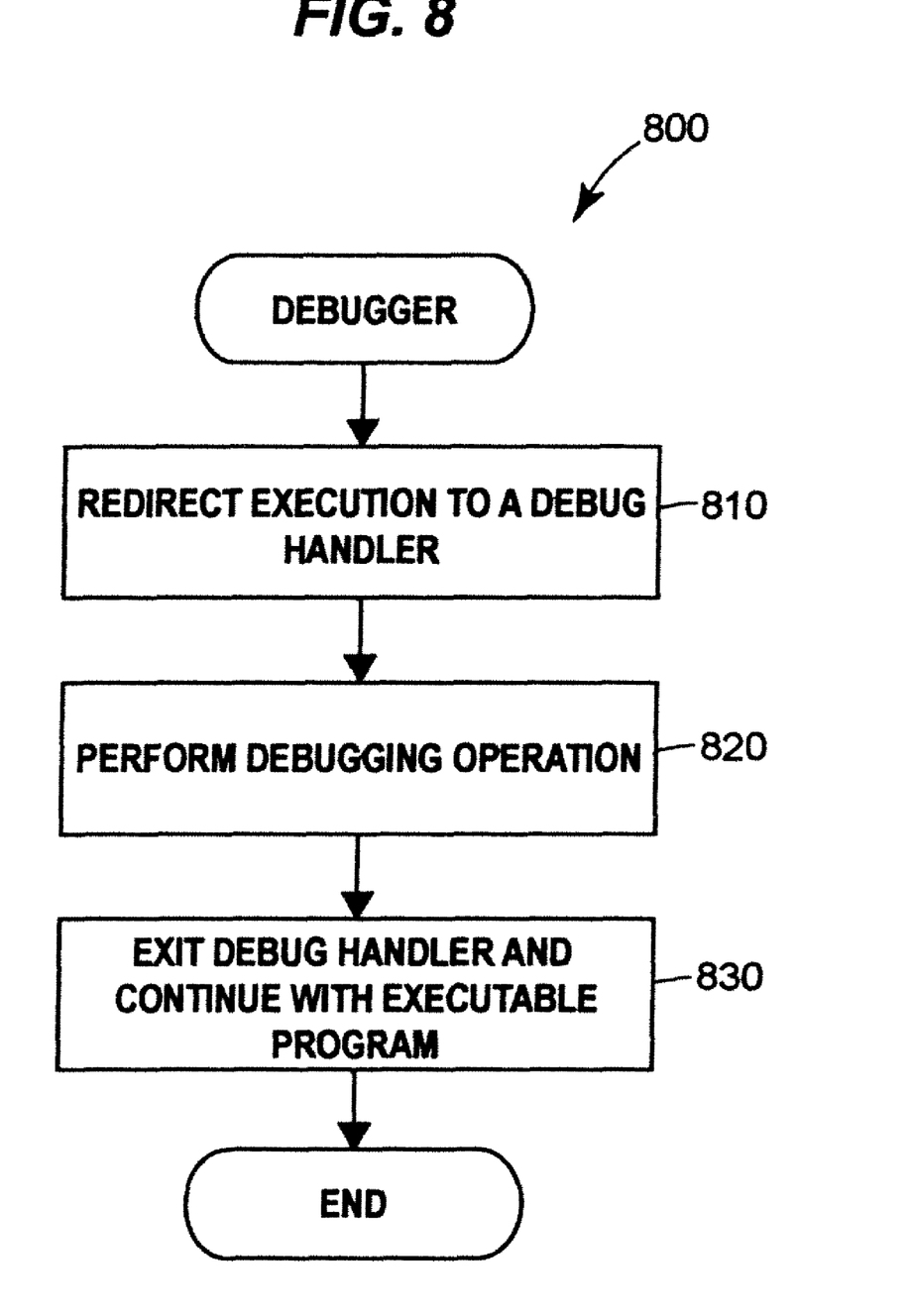
FIG. 8 is a flowchart of a process for implementing a debugging operation according to yet another embodiment.

FIG. 8 is a flowchart of a process 800 for implementing a debugging operation using the debugger 120 according to yet another embodiment. Referring to FIG. 8, after a breakpoint instruction is executed by the computing device 140, the computing device 140 may redirect execution of the executable program to a debug handler process stored in the main memory 150 at block 810. At block 820, the debugger 120 may communicate with the target system 130 via the communications and control interface 160 to allow the user to perform a debugging operation. For example, during a debugging operation, the user may monitor the contents of all internal components, registers, and peripherals associated with the computing device 140 to verify whether the computing device 140 is operating correctly. After the user performs the debugging operation, the debugger 120 may instruct the computing device 140 to exit the debug handler process and continue with the executable program at block 830. Thereafter, the computing device 140 may resume normal processing.

What is claimed is:

1. A method for setting a breakpoint, the method comprising:
receiving at least one input specifying a location for insertion of a breakpoint in an executable program located in a main memory, the at least one input selected from the group consisting of an instruction, a label, a line number, and a function name;

determining a breakpoint address for insertion of the breakpoint in the executable program by mapping the specified location to the breakpoint address;

moving an original instruction at the breakpoint address in the main memory to a separate memory location, the separate memory location selected from the group consisting of an external device and a debugger;

(a) if a locked line exists in a cache memory, then writing a breakpoint instruction into the locked line of the cache memory at the breakpoint address, the cache memory being physically separate from the main memory, and determining whether the breakpoint is one of a software breakpoint and a hardware breakpoint:

(a. i.) if the breakpoint is the hardware breakpoint, then storing the breakpoint address into a breakpoint register associated with a computing device,   (a. ii.) if the breakpoint is the software breakpoint and the breakpoint address is located in writable space of the main memory, then moving an original instruction at the breakpoint address in the main memory to a separate memory location and writing the breakpoint instruction into the main memory at the breakpoint address, and   (a. iii.) if the breakpoint is the software breakpoint and the breakpoint address is not located in writable space of the main memory, then     (a. iii. 1.) writing the breakpoint instruction into a locked line of the cache memory that corresponds to the breakpoint instruction,     (a. iii. 2.) copying a line corresponding to the breakpoint address from the main memory,     (a. iii. 3.) writing the copied line to the cache memory at the breakpoint address,     (a. iii. 4.) writing the breakpoint instruction into the copied line of the cache memory at the breakpoint address, and     (a. iii. 5.) locking the line containing the breakpoint instruction into the cache memory, for conditions (a.i) to (a.iii), when the break point instruction is executed, then transferring control from the executable program to the debugger;

(b.) if a locked line does not exist in the cache memory, then rejecting the breakpoint and notifying a user.

2. A system for setting a breakpoint, the system comprising:

a target module comprising a main memory and a cache memory;

a development module comprising:

an input unit to receive an input specifying a location for insertion of a breakpoint in the main memory, the input selected from the group consisting of an instruction, a label, a line number, and a function name;

an address unit coupled to the input unit, the address unit configured to determine a breakpoint address for insertion of the breakpoint in the main memory by mapping the specified location to the breakpoint address; and   a write unit coupled to the address unit, the write unit configured to move an original instruction at the breakpoint address to a separate memory location, the separate memory location selected from the group consisting of an external device and a debugger, the write unit further configured to determine:

(a.) if a locked line exists in the cache memory, then write a breakpoint instruction into the locked line of the cache memory at the breakpoint address, the cache memory being physically separate from the main memory, and determining whether the breakpoint is a software breakpoint or a hardware breakpoint;

(a. i) if the breakpoint is the hardware breakpoint, then storing the breakpoint address into a breakpoint register associated with a computing device;

(a. ii.) if the breakpoint is the software breakpoint and the breakpoint address is located in writable space of the main memory, then moving an original instruction at the breakpoint address in the main memory to a separate memory location and writing the breakpoint instruction into the main memory at the breakpoint address;

(a. iii) if the breakpoint is the software breakpoint and the breakpoint address is not located in writable space of the main memory, then       (a. iii. 1.) writing the breakpoint instruction into a locked line of the cache memory that corresponds to the breakpoint instruction;

(a. iii. 2.) copying a line corresponding to the breakpoint address from the main memory;

(a. iii. 3.) writing the copied line to the cache memory at the breakpoint address;

(a. iii. 4.) writing the breakpoint instruction into the copied line of the cache memory at the breakpoint address;

(a. iii. 5.) locking the line containing the breakpoint instruction into the cache memory;

for conditions (a.i) to (a.iii) when the break point instruction is executed then transferring control from the executable program to the debugger;

(b.) if a locked line does not exist in the cache memory, then rejecting the breakpoint and notifying a user;

a serial communication link connecting the development module to the target module; and a processor executing the development module and the target module, the processor and the cache memory located on a single chip.

* * * * *